United States Patent [19]

Köös

[11] 4,166,146
[45] Aug. 28, 1979

[54] SANDWICH UNIT FOR WALL COATING

[76] Inventor: Tibor Köös, 411 23 Göteborg, Sweden

[21] Appl. No.: 877,630

[22] Filed: Feb. 14, 1978

[30] Foreign Application Priority Data

Feb. 16, 1977 [SE] Sweden .............................. 77017168

[51] Int. Cl.² .............................................. B32B 3/26
[52] U.S. Cl. .................................... 428/315; 428/311; 428/328
[58] Field of Search ............... 428/304, 309, 320, 321, 428/322, 328, 329, 330, 314, 315, 311

[56] References Cited

U.S. PATENT DOCUMENTS

| | | | |
|---|---|---|---|
| 3,287,202 | 11/1966 | Petriello | 428/309 |
| 3,351,513 | 11/1967 | Menzer | 428/204 |
| 3,414,455 | 12/1968 | Twomey, Jr. et al. | 428/328 |
| 3,591,400 | 7/1971 | Palmquist et al. | 428/328 |
| 3,876,552 | 4/1975 | Moynihan | 428/328 |
| 3,988,494 | 10/1976 | McAdow | 428/328 |

*Primary Examiner*—William J. Van Balen
*Attorney, Agent, or Firm*—Blanchard, Flynn, Thiel, Boutell & Tanis

[57] ABSTRACT

Sandwich unit for a heat insulating wall coating having a surface layer facing the room confined by the wall, an intermediate layer adhered to the surface layer and being of plastic foam, and a third layer adhered to the intermediate layer and facing the wall. The third layer comprises an electrically insulating plastic foil and metal flakes embedded in the plastic foil and thereby electrically insulated from each other. The flakes are disposed with their broad side parallel to the foil and overlap each other to form an unbroken total surface for reflecting heat radiation.

9 Claims, 2 Drawing Figures

SANDWICH UNIT FOR WALL COATING

FIELD OF THE INVENTION

The invention as described herein pertains to a sandwich unit for coating of walls, containing several layers adhered to each other. An outermost layer faces, with its free surface, the space confined by the wall, thereupon is superposed an intermediate layer of foam plastic or similar stuff, and finally a further layer facing the wall, and intended to be adhered to this.

DESCRIPTION OF PRIOR ART

Various kinds of sandwich units are known, for wall coating, containing one foam plastic layer for thermic insulation to which is adhered a layer for reflecting radiation, made of a metallic foil. The purpose of these is to arrest transmission of heat between both sides of the wall. The transmission of heat is arrested by acting together of the foam plastic, which has a very low coefficiency of heat transmission, and of the metal foil which reflects incident heat radiation.

According to the German Offenlegungsschrift No. 2 013 001 a wall coating is known, for heat insulation, containing one layer of foam plastic, and one layer of aluminum foil adhered to one or both surfaces of the foam plastic. Accordingly to the Swedish patent publication 334 360 is known that to one heat insulating underlay of foam plastic, connect one plastic film which is provided with a steamed metallic layer. The metallic layer is covered by a proection coating.

Insulating wall coatings of these known designs are efficient from thermic point of view but are at the same time impaired with certain drawbacks in electrical installations. The metallic foil makes the wall coating electrically conducting, which may bring about the chance of electric overconduction and also chance of personal injury if the coating has a voltage applied thereto.

SUMMARY OF THE INVENTION

The purpose of the invention is to achieve a heat insulating wall coating—a so called heat tapestry—especially intended for use in dwelling rooms, office premises, storage spaces, workshops, and other spaces where there is any need of maintaining a suitable regulation of temperature, and thus where there is interest in arresting the transmission of heat, to greatest possible extent, between the space enclosed by the walls, and surrounding spaces.

The sandwich unit according to the invention is, of course, also suitable for heat insulation of any larger or smaller space, such as test chambers, a storage container, or any other kind of space demanding good thermical insulation.

In the purpose as stated above, the invention is characterized in that a further added layer, facing the wall consists of an electrically insulative plastic foil, and therein enclosed metal flakes which are orientated so that the broad side of these flakes is parallel with the plastic foil.

These so called metal flakes consist of very small metal elements produced by means of rolling of metal powder. The metal flakes are of shape of small irregular discs of size in diameter $2-3\mu$ and thickness in the range of $0.5-1\mu$.

For achievement of the electric insulating capacity, aimed at, by the plastic foil, each metal flake is embedded in plastic material, so that the flakes become electrically insulated from each other. The flakes lay distributed so in the plastic foil, that they are overlapping each other in plane projection and thereby form an unbroken reflecting surface.

The flakes are, as indicated above, relatively small and are mainly of size in plane in the range of $2-4\mu$. The flakes consist suitably of a metal with dense structure of surface, and thereby a good capacity of reflection, such as aluminum, copper, gold or silver.

In a suggested form of design, the plastic foil consists of a plastic material of good mechanical capacities, and capacity in resisting the effect of moisture and chemicals, such as for instance polystyrene. The intermediate layer may suitably consist of foamed-up polyester with gas content of argon or freon.

In order to eventually achieve a wall coating for spaces of the kinds as quoted above, the surface layer facing the room suitably may consist of paper treated with silicon. This outermost covering layer can be of varying conventional thickness, while the intermediate layer of foam plastic preferably can be of a thickness of 4–6 mm, and the plastic foil, finally, of a thickness of approximately 0.2 mm.

BRIEF DESCRIPTION OF THE DRAWINGS

The attached drawing is schematically illustrative of the sandwich unit according to the invention.

DESCRIPTION OF THE PREFERRED EMBODIMENT

Figure 1:
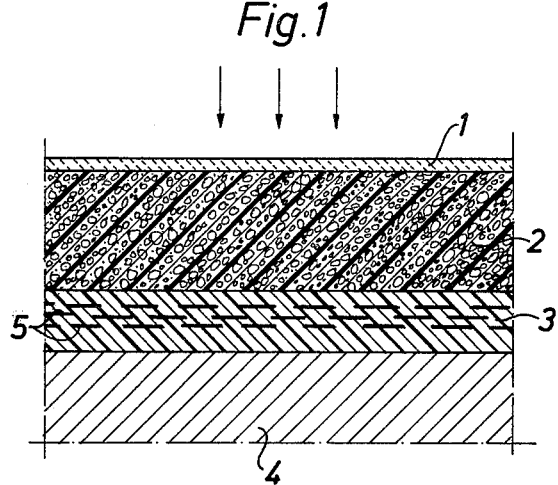
FIG. 1 shows a section through one part of the sandwich unit, thereby the thickness indicated of the different layers are not in accordance with scale.

As shown in FIG. 1, the sandwich unit according to the invention comprehends one outermost covering layer 1. This layer may consist of any suitable coating material of suitable physical and chemical properties to serve as confining surface facing the insulative volume. For a dwelling room, or other space of similar character, the surface layer suitably may consist of a silicone-treated paper layer of suitable surface structure, pattern, and color combination to achieve esthetic values desired.

The sandwich unit can, however, with similarly good heat insulating effect, be employed also beneath a conventional wall coating, or floor covering such as chipboard, wall-to-wall carpeting, or similar. In such case the layer 1 may suitably consist of a plastic film of PVC-type. Other covering layers suited for painting on afterwards may also be used, such as interior ceiling covering.

The intermediate layer 2 consists of plastic foam. The plastic is here a polyester, suitably, which form the aspect of fire emergencies is preferred, as this material is not likely to flame. The foam plastic contains cells of 0.1 mm size in diameter, whereof 50 percent are enclosed, and 50 percent are open cells. The enclosed cells can be filled with freon-gas, or with an inert gas such as argon.

The plastic foil 3 is, for the sake of distinctivity shown in FIG. 1 in exaggerated thickness. The plastic material in the foil consists preferably of polystyrene. In this plastic foil a large number of so-called metal flakes 5 consisting of small disc-shaped elements are enclosed, and are orientated so that the board sides thereof are parallel with the plastic foil 3. The metal flakes are produced by rolling of a metal powder of particle size in the range of 2–3µ. Thereby small disc-shaped elements are produced of diameter in the range of 2 to 4µ, and thickness in the range of 0.5–1µ. The metal flakes are inserted into the plastic foil 3, synchronized with the rolling process thereof, so that the parallel orientation, earlier mentioned, of the flakes is achieved. The metal flakes are added in such a number, that they overlap each other to a sufficient extent in the way shown in principle in FIG. 2 which shows a number of metal flakes in a larger scale. By adding the metal flakes in sufficient number of overlap each other, they will in plane projection form an uninterrupted reflecting metal surface. During the rolling of the metal flakes into the plastic foil, the flakes are oriented, as indicated, parallel with the foil, and are embedded each for itself in the plastic foil, so that any conductive electrical contact between the flakes will not arise. Hereby it will be avoided that the plastic foil, and therewith the sandwich unit according to the invention, becomes electrically conductive. Suitably the metal flakes consist of a metal of dense surface structure, and thereby good capacity of reflecting incident electro-magnetic radiation, particularly radiation of heat. Suitable metals having such properties are for instance, aluminum, copper, gold or silver.

As seen in FIG. 1, the sandwich unit according to the invention, is adhered to a face of a wall 4, the plastic foil 3 laying against this wall face and being in a conventional way adhered to the face by means of some kind of adhesive.

Figure 2:
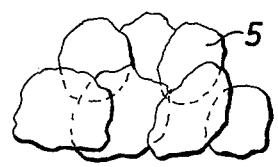
FIG. 2 shows in a larger scale the arrangement of a number of metal flakes in the plastic foil, as seen in plane projection.

Heat radiation directed to the sandwich unit, as shown by arrows on FIG. 2, penetrates the layers 1 and 2, and there lets off a smaller part of its energy. As the radiation hits layer 3 it is reflected to a larger extent from the board sides of the metal flakes 5, acting with their gathered effect, and goes back via layers 2 and 1 to the room into which covering layer 1 faces. Tests carried out have made clear that the sandwich unit according to the invention produces a considerable decrease in heat transmission from a room confined by the unit, to the surroundings. This decrease, expressed in energy let off, for maintaining, under otherwise similar conditions, a determined difference of temperature between the enclosed space and the surroundings, amounts to 20 percent approximately.

In the embodiment as described above it is assumed that the sandwich unit is mounted to an interior wall, and with the outer face 1 of the surface facing the room to be insulated. In this case the outer layer 1 is designed so that it suitably serves as a confining wall in the room. The outer layer may in this way be made up in the form of tapestry, or consist of a layer with a surface suited as undercover for subsequent finish in the form of painting, paint-spraying or other decorative finishing.

It is, however, also possible to install the sandwich unit inside a conventional interior decorating coating in the room, such as a wall or ceiling covering of matched boards, chipboards, etc., or beneath floor covering in the shape of, for instance a wall-to-wall carpeting.

The surface layer 1 may in that case be of a sufficiently strong plastic film. It is also possible to use the sandwich unit as the interior lining of thermic insulated containers, wherein the layer facing the container's inside space may be made up by any material required with regard to the purpose of the container or vessel.

The sandwich unit according to the invention can be employed for insulating spaces of lower temperatures in relation to surrounding space.

Thickness of the layers which make up the unit may be varied with regard to the particular purposes for which a particular unit is intended.

As a coating for dwelling rooms and the like in a building, the outermost layer or the coating surface may be of thickness approx. 0.5–1 mms or less, the intermediate of foam plastic of a thickness of approx. 4–6 mms, and the plastic foil a thickness of approx. 0.2 mms. The installation of a coating like this, does not cause any of the problems earlier connected with installation of resembling sandwich units provided with unbroken metal foil, as the new sandwich unit according to the invention is not electrically conductive, and thus diminishes the chances of electric conduction and possible injuries by means of metallic foil layers to which a voltage is applied.

I claim:

1. A heat transfer resisting sandwich unit for wall coating, comprising in combination a surface layer facing the room bounded by the wall to be coated, one intermediate layer adhered to said surface layer and being of plastic foam, and a third layer adhered to said intermediate layer and facing the wall, said third layer comprising an electrically insulating plastic foil and metal flakes embedded therein and electrically insulated one from another by said plastic foil, said flakes being oriented with their broad side parallel to the foil in a manner known per se, said flakes further disposed in overlapping relation and therewith cooperatively forming an unbroken total surface for reflecting heat radiation thereon.

2. Sandwich unit according to claim 1, in which the flakes are of a plane size in the range of 2–4µ and of a thickness in the range of 0.5–1µ.

3. Sandwich unit according to claim 1, in which the flakes consist of a metal of dense surface structure.

4. Sandwich unit according to claim 3, in which said metal is selected from the group consisting of aluminum, copper, gold or silver.

5. Sandwich unit according to claim 1, in which the plastic foil is of polystyrene.

6. Sandwich unit according to claim 1, in which the surface layer comprises paper treated with silicone.

7. Sandwich unit according to claim 1, in which the surface layer comprises a plastic foil.

8. Sandwich unit for wall coating, comprising a surface layer facing the room confined by the wall, one intermediate layer adhered to said surface layer and being of plastic foam, and one third layer adhered to the intermediate layer and facing the wall, in which the third layer comprises an electrically insulating plastic foil with metal flakes electrically insulated from each other and enclosed therein, said flakes being orientated with their broad side parallel to the plastic foil, said flakes overlapping each other and in plane projection forming an intact reflecting surface in which the intermediate layer consists of foamed-up polyester with gas filling of argon or freon in relation 50% enclosed and 50% open cells.

9. Sandwich unit for wall coating, comprising a surface layer facing the room confined by the wall, one intermediate layer adhered to said surface layer and being of plastic foam, and one third layer adhered to the intermediate layer and facing the wall, in which the third layer comprises an electrically insulating plastic foil with metal flakes electrically insulated from each other and enclosed therein, said flakes being orientated with their broad side parallel to the plastic foil, said flakes overlapping each other and in plane projection forming an intact reflecting surface in which the intermediate layer of foam plastic is of a thickness of approximately 4–6 mm, and the plastic foil is of a thickness of about 0.2 mms.

* * * * *